2,990,423
HYDROCARBYLAMINOHYDROCARBYL BORATE/DIBORANE ADDUCTS AND THEIR PREPARATION
Henry C. Miller, Wilmington, Del., assignor to E. I. du Pont de Nemours and Company, Wilmington, Del., a corporation of Delaware
No Drawing. Filed July 17, 1959, Ser. No. 827,726
12 Claims. (Cl. 260—462)

This invention relates to a new class of boron compounds and to their preparation. More particularly this invention relates to diborane adducts of organic borates and to a process for their preparation.

There have recently been prepared a variety of boron compounds which possess valuable reducing properties and which are useful in the electroless plating of metals. However, many of these boron-containing compounds are too volatile or have too low a water solubility to be useful in certain applications. It is therefore a desirable goal to provide new boron-containing reducing agents having low volatility and especially to provide such compounds having the desirable combination of low volatility and high water solubility.

It is an object of this invention to provide a new class of boron compounds and a process for their preparation. A further object is to provide diborane adducts of organic borates and a process for their preparation. A still further object is to provide new boron-containing reducing agents. Another object is to provide new boron-containing reducing agents having low volatility and improved water-solubility. Other objects will appear hereinafter.

These and other objects of this invention are accomplished by providing diborane adducts of hydrocarbylaminohydrocarbyl borates having the following general formula:

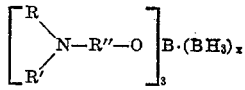

where R is hydrogen or hydrocarbon free of aliphatic unsaturation, R' is hydrocarbon free of aliphatic unsaturation, R" is a divalent hydrocarbon group of at least two carbon atoms containing terminal aliphatic carbons and which is free of aliphatic unsaturation, and $x$ is a positive integer from 1 to 3, i.e., 1, 2, or 3. A preferred group of the products of this invention are those in which R and R' in the above formula are alkyl groups of 1–6 carbon atoms, R" is an alkylene group of 2–6 carbon atoms, and $x$ is 2 or 3.

It has now been found that novel boron compounds having improved properties are provided by this invention. The hydrocarbylaminohydrocarbyl borate/diborane adducts of this invention are non-volatile at room temperature. They show no evidence of distillation or sublimation when heated at 100° C. under one micron mercury pressure. The products of this invention are soluble in nonpolar solvents, e.g., in hydrocarbons such as benzene, and in chloroform, alcohol, and dioxane. The products of this invention in which the total number of carbon atoms in all of the R, R', and R" groups is less than 18 are also soluble in water.

The products of this invention can be prepared by contacting a hydrocarbylaminohydrocarbyl borate of the formula

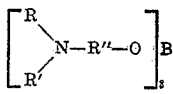

wherein R, R', and R" have the meanings given herein-before with diborane at ordinary temperatures. Reaction temperatures between about −10° and about 50° C. are convenient; however, higher or lower temperatures can be used if desired. The diborane is absorbed by the hydrocarbylaminohydrocarbyl borate exothermically. The reaction is continued until the absorption of diborane by the hydrocarbylaminohydrocarbyl borate ceases. The reaction product is subjected to elevated temperatures and reduced pressures, e.g., 100° C. and 1 micron mercury pressure, to remove unused starting material and any volatile by-products.

The proportions of diborane and hydrocarbylaminohydrocarbyl borate employed in the process of this invention will depend upon the particular type of adduct desired, i.e., whether $x$ in the general formula is 1, 2, or 3. Thus, when a product where $x$ is 1 is desired, one-half mole of diborane is used for one mole of the hydrocarbylaminohydrocarbyl borate. On the other hand, where an adduct in which $x$ is 3 is desired, at least 1.5 moles, and preferably an excess, of diborane is used with each mole of the borate. The use of an excess of diborane in the latter case causes more complete reaction of the hydrocarbylaminohydrocarbyl borate starting material, and any excess diborane is readily recovered.

As indicated above, the reaction takes place at ordinary temperatures and the reaction pressure is not critical. Reaction pressures ranging from subatmospheric to superatmospheric can be used. Under these conditions the reaction takes place rapidly. Reaction times varying from 5 minutes to 60 minutes are usually sufficient for a reaction carried out at room temperature and atmospheric pressure. Longer or shorter times can be used, especially when the reaction is carried out at lower or higher temperatures, respectively.

The reaction between the diborane and the hydrocarbylaminohydrocarbyl borate takes place readily in the absence of any solvent or reaction medium. However, if desired, an inert solvent such as a hydrocarbon, e.g., benzene, or an ether, e.g., dioxane, can be employed.

In another embodiment of this invention the hydrocarbylaminohydrocarbyl borate can be prepared in situ in the reaction mixture. In this embodiment, diborane is brought into contact at ordinary temperatures with a hydrocarbylaminohydrocarbyl alcohol of the formula

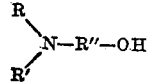

wherein R, R', and R" have the meanings defined previously. In this embodiment, hydrogen is evolved by the reaction of the diborane with the amino alcohol to form the hydrocarbylaminohydrocarbyl borate which then reacts with more diborane to form the products of this invention. The end point of this reaction is readily evidenced by the cessation of evolution of hydrogen.

The starting materials used in the process of this invention can be of the ordinary grades of these materials commonly available. However, the hydrocarbylaminohydrocarbyl borate, or the hydrocarbylaminohydrocarbyl alcohol, should be anhydrous as any water present in the reactants will combine with the diborane and thus reduce the amount of this reactant available to form the products desired.

The products and process of this invention are illustrated in further detail in the following examples.

EXAMPLE I

*Tris(dimethylaminoethyl) borate trisborane*

A reaction vessel is charged with freshly distilled dimethylaminoethanol (13.6 g., 0.153 mole) and is cooled to −80° C. Diborane (0.077 mole) is then introduced into the reaction vessel during a period of a few minutes, during which time the diborane is absorbed by the dimethylaminoethanol. Upon warming the mixture to room temperature (25° C.), approximately one mole of hydrogen per mole of dimethylaminoethanol is rapidly evolved. The reaction product is a clear viscous liquid at room temperature. This residue is evaporated at a pressure of less than 1 micron mercury at room temperature, and there is obtained a residue which turns solid and is nonvolatile at room temperature. A small portion of this residue heated slowly to 100° C. at 1 micron mercury pressure shows no evidence of sublimation or distillation. The solid is washed with diethyl ether and is then dried in vacuo to leave 4.2 g. of pure white solid. This product is very hygroscopic and evolves no hydrogen when dissolved in water or alcohol. The resulting solutions are strongly basic. Acidification of these solutions causes slow evolution of hydrogen. Silver ion is reduced rapidly by the acid solutions; however, nickel is not precipitated at any pH.

Analysis.—Calcd. for $C_{12}H_{39}O_3B_4N_3$: C, 45.5%; H, 12.42%; B, 13.68%; N, 13.28%; $H_2$ on hydrolysis 636 cc./g.; M.W., 316.7. Found: C, 45.34%; H, 12.30%; B, 14.39%; N, 13.15%, 13.24%; $H_2$ on hydrolysis 600 cc./g.; M.W., 304, 304.

These analytical data indicate the product to be the borane adduct of tris(dimethylaminoethyl) borate of the following formula:

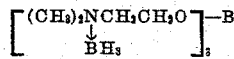

An aqueous 0.1 molar $NiCl_2$ solution containing about 0.3% of the borane adduct of tris(dimethylaminoethyl) borate of Example I is heated to 90° C. A copper wire is immersed in the solution (which has a pH of about 6) for a period of one to two hours. At the end of this time the copper wire has become nickel plated.

EXAMPLE II

*Tris(dimethylaminoethyl) borate trisborane*

A mixture of 31 g. of dimethylaminoethanol (0.35 mole) and a large excess of methyl borate is distilled through a precision still until the head temperature reaches 68.7° C. (the boiling point of methyl borate), thus removing the methanol/methyl borate binary (B.P. 54.6° C.) and converting the dimethylaminoethanol to its borate ester, tris(dimethylaminoethyl)borate. The mixture of methyl borate and tris(dimethylaminoethyl) borate is then freed of methyl borate by room temperature distillation under high vacuum, leaving 31.1 g. of nonvolatile tris(dimethylaminoethyl)borate.

Analysis.—Calcd. for $C_{12}H_{30}O_3BN_3$: C, 58.7%; H, 11.83%; B, 3.41%; N, 13.3%. Found: C, 60.61%; H, 11.66%; B, 3.37%; N, 10.1%.

This ester (29.0 g., 0.317 gram atoms of N) is treated with a total of 0.161 mole of diborane at −80° C. Rapid exothermic absorption of diborane occurs and the mixture turns solid at +10° C. as the mixture is warmed. About 100 ml. of dry benzene is then added to give a fluid mixture which is stirred at room temperature until diborane absorption ceases after about 3 hours. A total of 0.155 mole of diborane is consumed. This corresponds to a B/N ratio of 0.98. More benzene is added to make a total of about 200 ml. The nearly clear solution is filtered and the filtrate is diluted to about 500 ml. with petroleum ether, whereupon a white solid precipitates. This solid, after drying, amounts to 29.8 g. (89.5% of theory). It melts at 86–89.5° C.

Analysis.—Calcd. for $C_{12}H_{39}O_3B_4N_3$: C, 45.5%; H, 12.42%; N, 13.28%. Found: C, 46.44%; H, 12.65%; N, 13.51%, 13.53.

EXAMPLE III

*Tris(3-dimethylaminopropyl) borate bisborane*

Freshly distilled 3-dimethylaminopropanol (14.3 g.; 0.139 mole) is treated repeatedly on a vacuum train with methanol-free methyl borate until the recovered methyl borate is also methanol-free as judged by the vapor pressure of the recovered methyl borate. There remains 14.8 g. of slightly viscous, colorless liquid containing 3.37% boron (theory for tris(dimethylaminopropyl) borate is 3.4% boron). A portion of this ester (13.0 g., 0.123 gram atoms of nitrogen) is placed in a reaction vessel cooled to −80° C., and 0.0616 mole of diborane is added. There is little absorption of diborane until the mixture is warmed to about 0° C. whereupon the diborane is suddenly absorbed exothermically. The mixture is stirred at room temperature with an excess of diborane until absorption ceases. The unused diborane is then recovered and measured. There is no material not condensed at −196° C. formed in the reaction. The amount of diborane used in the reaction is 0.0396 mole corresponding to 1.92 gram atoms of boron per 3 gram atoms of nitrogen. The product is a very viscous, colorless liquid sparingly soluble in water. The aqueous solution is weakly basic and does not actively evolve hydrogen even when made strongly basic or acidic. The aqueous solution rapidly reduces silver ions to silver at room temperature and nickel ions to nickel at 90° C. This product is soluble in ether, benzene, and alcohol (with no hydrogen evolution), but is insoluble in petroleum ether.

Infrared analysis shows absorptions at 4.4 microns (sharp) and 4.2 microns (broad, with a shoulder at 4.3 microns). The $B^{11}$ nuclear magnetic resonance spectrum in aqueous methanol is quite diffuse but a quadruplet is discernible ($BH_3$) and there is a suggestion of a weaker singlet at a lower field, which would be expected from the borate boron atom. The product contains 9.26% boron and on acid hydrolysis 377 cc. of hydrogen is released per gram of sample (1.68% hydrolyzable hydrogen). Tris(3-dimethylaminopropyl) borate bisborane of the formula given below should give 413 cc. of hydrogen per gram (1.83% hydrolyzable hydrogen) on hydrolysis and would contain 9.32% of B:

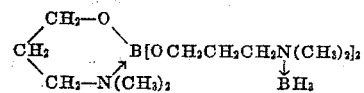

The examples have illustrated the products and process of this invention by reference to the reaction of certain hydrocarbylaminohydrocarbyl alcohols, and borates, with diborane. However, the invention includes other specific adducts of the formula $$\left[\begin{array}{c}R\\R'\end{array}\!\!>\!\!N\!-\!R''\!-\!O\right]_3 B\cdot(BH_3)_x$$

Thus, when the particular hydrocarbylaminohydrocarbyl alcohols, or borates, of the examples are replaced with the specific hydrocarbylaminohydrocarbyl alcohols or borates listed in the following Table I and reacted with diborane under the conditions of the appropriate examples, the respective hydrocarbylaminohydrocarbyl borate/borane adducts listed in the following Table II are obtained.

TABLE I

*Hydrocarbylaminohydrocarbyl alcohol or borate reactants*

(a) $C_2H_5NHCH_2CH_2OH$
(b) $(C_4H_9)_2NCH_2CH_2OH$
(c) $(CH_3NHCH_2CH_2CH_2CH_2CH_2O)_3B$
(d) $[(C_6H_5CH_2)_2NCH_2CH_2O]_3B$
(e) $(C_6H_{11})_2NCH_2CH_2CH_2CH_2OH$
(f) 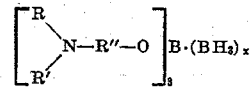

(g) $(C_{18}H_{37}NHCH_2CH_2CH_2-O)_3B$
(h) $[(C_{12}H_{25})_2NCH_2CH_2O]_3B$

TABLE II

*Hydrocarbylaminohydrocarbyl borate/borane products*

(A) $[C_2H_5NH(BH_3)CH_2CH_2O]_3B$
(B) $[(C_4H_9)_2N(BH_3)CH_2CH_2O]-B[OCH_2CH_2N(C_4H_9)_2]_2$
(C) $[CH_3NH(BH_3)(CH_2)_6O]_3B$
(D) $[(C_6H_5CH_2)_2N(BH_3)CH_2CH_2O]-B[OCH_2CH_2N(CH_2C_6H_5)_2]_2$
(E) $[(C_6H_{11})_2N(BH_3)(CH_2)_4O]_3B$
(F) $[(CH_2)_5N(BH_3)CH_2CH_2O]_2B[OCH_2CH_2N(CH_2)_5]$
(G) $[C_{18}H_{37}NH(BH_3)(CH_2)_3O]_3B$
(H) $[(C_{12}H_{25})_2N(BH_3)CH_2CH_2O]_3B$

In the reactants and products of the above tables illustrative of this invention, the R and R' radicals are hydrocarbon radicals free from aliphatic unsaturation of up to 18 carbon atoms. While the specific R and R' radicals in these reactants and products are ethyl, butyl, methyl, benzyl, cyclohexyl, pentamethylene, octadecyl and dodecyl, R and R' can be any hydrocarbon radical free from aliphatic unsaturation of up to 18 or more carbon atoms. R'' can be any divalent hydrocarbon radical of at least two carbon atoms containing terminal aliphatic carbons and which is free of aliphatic unsaturation. In the reactants and products of the above tables, R'' is illustrated by the specific divalent hydrocarbon radicals ethylene, hexylene, butylene, and propylene. It is preferred that R and R' be lower alkyl radicals of up to 6 carbon atoms and that R'' be lower alkylene radicals of 2 to 6 carbon atoms.

The hydrocarbylaminohydrocarbyl borate/diborane adducts of this invention are especially useful as reducing agents in particular applications as a result of their low volatility and their solubility characteristics. The marked difference between the volatility and solubility characteristics of the products of this invention and the corresponding properties of common borane reducing agents are shown in the following Table III.

as, the paper treated with the product of Example I is still strongly reducing after three hours' exposure to the atmosphere.

As many apparently widely different embodiments of this invention may be made without departing from the spirit and scope thereof, it is to be understood that this invention is not limited to the specific embodiments thereof except as defined in the appended claims.

The embodiments of the invention in which an exclusive property or privilege is claimed are defined as follows:

1. A boron compound having the general formula

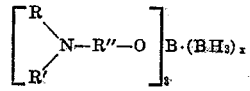

wherein R is selected from the group consisting of hydrogen and hydrocarbon radicals of up to 18 carbon atoms and free from aliphatic unsaturation, R' is a hydrocarbon radical of up to 18 carbon atoms and free from aliphatic unsaturation, R'' is a lower alkylene radicals of at least 2 carbon atoms, and $x$ is a positive integer from 1 to 3 inclusive.

2. A boron compound having the general formula

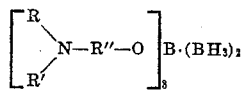

wherein R and R' are lower alkyl radicals and R'' is a lower alkylene radical of at least 2 carbon atoms.

3. A boron compound having the general formula

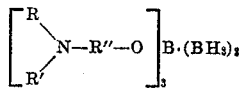

wherein R and R' are lower alkyl radicals and R'' is a lower alkylene radical of at least 2 carbon atoms.

4. Tris(dimethylaminoethyl) borate trisborane.

TABLE III
*Properties of boron-containing reducing agents*

| Boron Compounds | Volatility (As indicated by B.P.) | Water Solubility (g./l.) |
|---|---|---|
| $[(CH_3)_2NCH_2CH_2O]_3B$ ↓ $BH_3$ | More than 100°/0.001 mm. | 360. |
| $[(CH_3)_2NCH_2CH_2CH_2O]_2BOCH_2CH_2CH_2N(CH_3)_2$ ↓ $BH_3$ | (non-volatile) | 46. |
| $(CH_3)_3N \cdot BH_3$ | 171°/760 mm.  60°/10 mm. | 17. |
| Pyridine$\cdot BH_3$ | 65°/1 mm. | Slight. |

A practical illustration of the superior properties of the hydrocarbylaminomydrocarbyl borate/diborane adducts of this invention as reducing agents, in comparison with trimethylamine borane is shown by the following test. Samples or filter paper are soaked in aqueous solutions of (1) trimethylamine·borane containing 1.73 g./100 ml. of the boron compound (giving a solution containing 0.26% boron and 0.71 normal in active hydrogen, i.e., H bound to boron), and (2) the tris(dimethylaminoethyl) borate triborane of Example I containing 2.5 g./l. of boron compound (giving a solution containing 0.34% boron and 0.71 normal in active hydrogen) and then air-dried. When the dried, treated paper is written on with aqueous silver nitrate solution, black, reduced silver residues are left on the paper. However, upon standing, the paper treated with the trimethylamine·borane rapidly loses its ability to reduce silver ions, presumably due to the high volatility of the trimethylamine·borane. This loss of reducing action is apparent in 30 minutes; where- 5. Tris(3-dimethylaminopropyl) borate bisborane.

6. Process of preparing a boron compound which comprises contacting and reacting diborane with a hydrocarbylaminomydrocarbyl borate of the formula $$\left[ \begin{array}{c} R \\ R' \end{array} \!\!\! N\!\!-\!\!R''\!\!-\!\!O \right]_3 \!\!B$$

wherein R is selected from the group consisting of hydrogen and hydrocarbon radicals of up to 18 carbon atoms and free from aliphatic unsaturation, R' is a hydrocarbon radical of up to 18 carbon atoms and free from aliphatic unsaturation, and R'' is a lower alkylene radical of at least 2 carbon atoms.

7. Process of preparing a boron compound as set forth in claim 6 wherein said hydrocarbylaminohydrocarbyl borate is formed in situ by contacting and reacting said diborane with a hydrocarbylaminohydrocarbyl alcohol of the formula

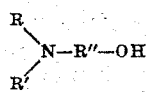

wherein R, R' and R'' are defined as set forth in claim 6.

8. Process of preparing a boron compound which comprises contacting and reacting diborane with a hydrocarbylaminohydrocarbyl borate of the formula

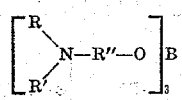

wherein R and R' are lower alkyl radicals and R'' is a lower alkylene radical of at least 2 carbon atoms.

9. Process of preparing a boron compound as set forth in claim 8 wherein said hydrocarbylaminohydrocarbyl borate is formed in situ by contacting and reacting said diborane with a hydrocarbylaminohydrocarbyl alcohol of the formula

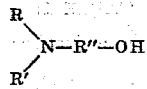

wherein R, R' and R'' are defined as set forth in said claim 8.

10. Process of preparing tris(dimethylaminoethyl) borate trisborane which comprises contacting and reacting diborane with tris(dimethylaminoethyl) borate.

11. Process of preparing tris(dimethylaminoethyl) borate trisborane as set forth in claim 10 wherein said tris(dimethylaminoethyl) borate is formed in situ by contacting and reacting said diborane with dimethylaminoethanol.

12. Process of preparing tris(3-dimethylaminopropyl) borate bisborane which comprises contacting and reacting diborane with tris(dimethylaminopropyl) borate.

No references cited.